Patented May 12, 1936

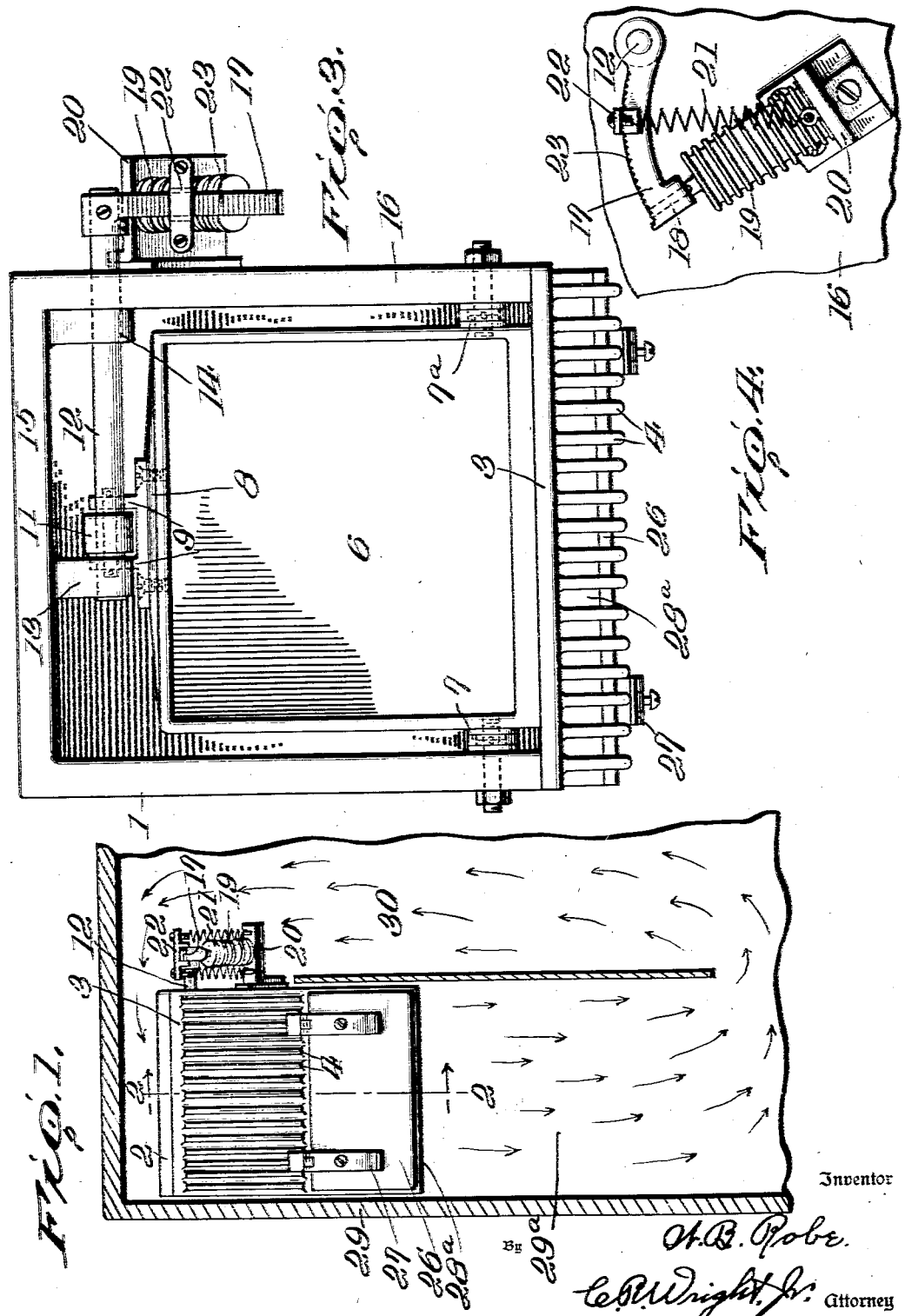

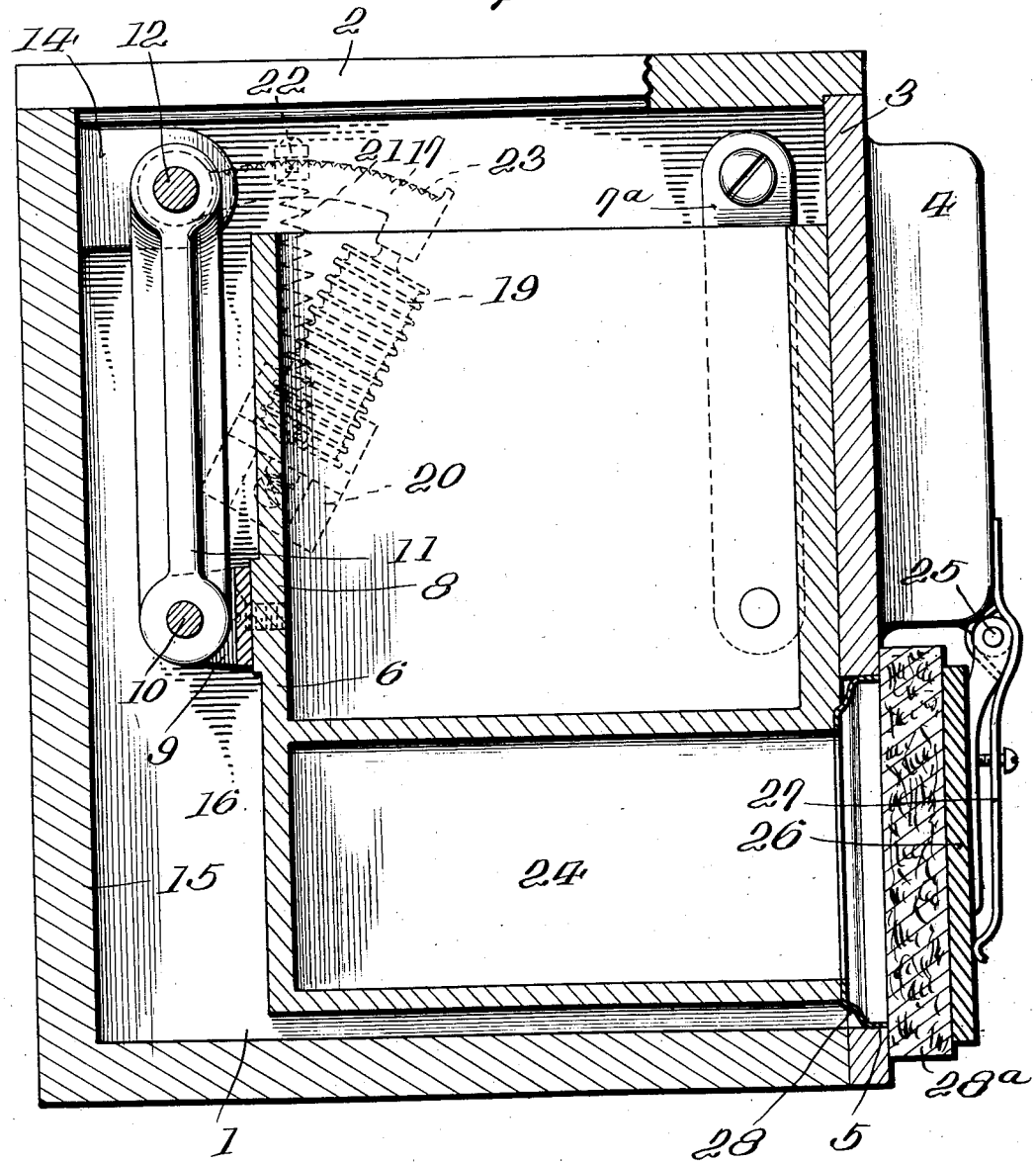

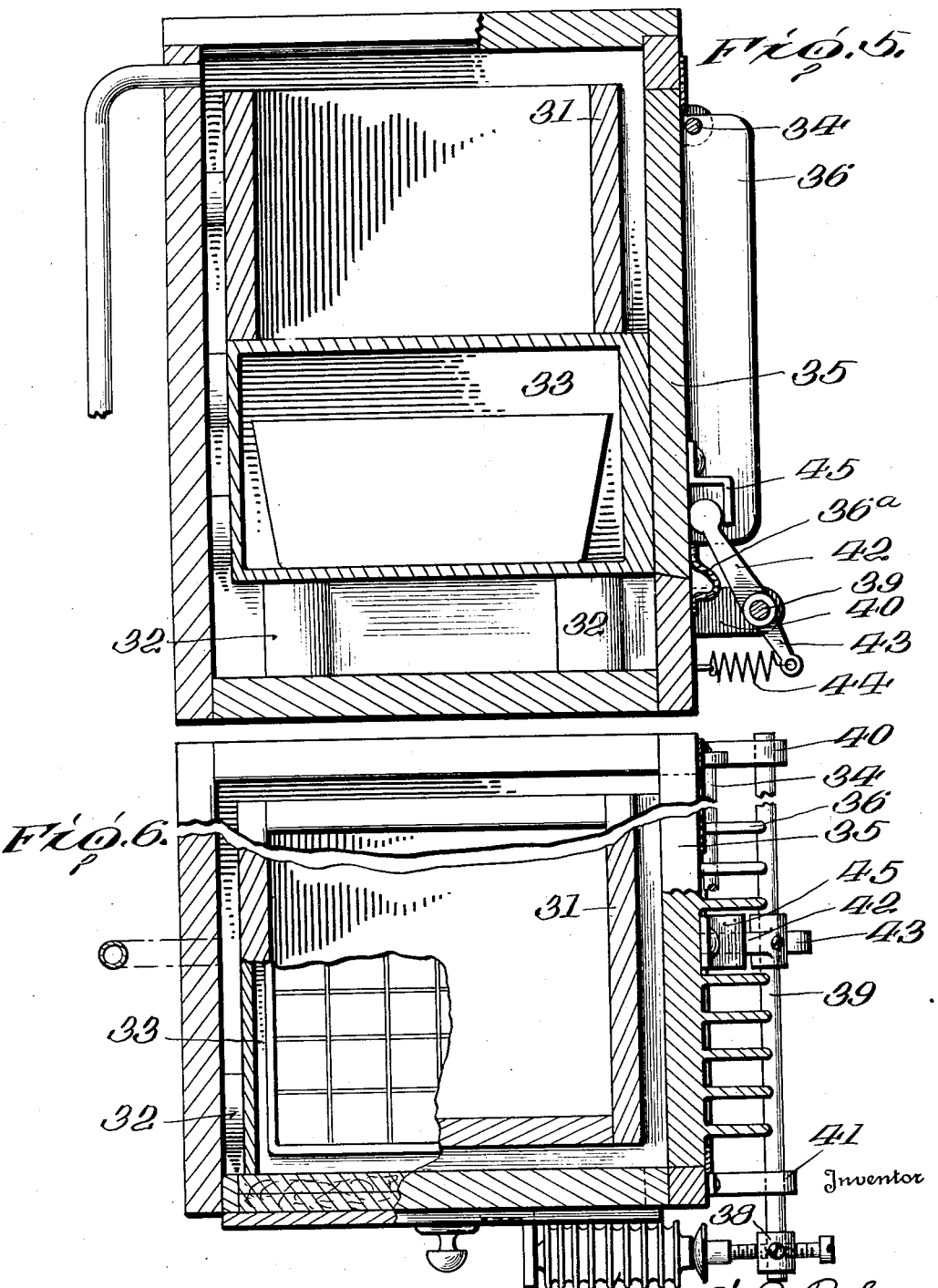

2,040,631

UNITED STATES PATENT OFFICE 2,040,631

MEANS FOR CONTROLLING SOLID CO₂ FOR REFRIGERATION PURPOSES

Walten B. Robe, Towson, Md., assignor, by mesne assignments, to William Burnet Wright, Baltimore, Md.

Application February 3, 1933, Serial No. 655,134

21 Claims. (Cl. 62—91.5)

My invention relates to new and useful improvements in means for controlling solid $CO_2$ for cooling purposes.

One object of my invention is to provide a unit in which solid $CO_2$ (known in the trade as dry ice) may be used for cooling purposes, and in which means is provided whereby the temperature of the chamber in which the unit is placed can be controlled and maintained at any temperature above the freezing point to about seventy-five degrees below zero.

Another object of my invention is to provide an apparatus of the above character whereby solid $CO_2$ may be placed in a container and the $CO_2$ vapor passing from the solid $CO_2$ is caused to fill the area of heat transfer from an inner to an outer container for insulating the same and to prevent the formation of frost or ice on the heat transfer surfaces.

A further object of my invention is to provide an apparatus of the character described in which the space between the inner solid $CO_2$ container and the outer container may be filled and maintained filled with $CO_2$ gas or vapor which is generated so as to aid in restricting transfer of heat between the containers for insulation and the prevention of frost or ice on the adjoining surfaces of either container.

In the accompanying drawings:—

Figure 1 is a vertical sectional view of a portion of an ordinary refrigerator showing my improved unit therein.

Figure 2 is an enlarged vertical sectional view of my improved unit.

Figure 3 is a top plan view of Figure 2 showing the cover removed.

Figure 4 is a side elevation showing the box broken away and showing the thermostat.

Figure 5 is a vertical sectional view of a modified form of the invention.

Figure 6 is a top plan view of Figure 5 partly in section.

Referring now to the drawings:—

1 represents an outer receptacle which is made of wood or any insulating material and is open at its upper end and closed by a removable cover 2 which closely fits the receptacle to make it practically air tight to prevent any air from entering the same. The front wall 3 of the receptacle is made of metal of high heat conductivity and provided on its outer face with the radiating blades 4 and the lower end thereof is provided with a rectangular opening 5 for a purpose hereinafter more fully described.

Within the outer insulated container 1 is a metal carbon dioxide receptacle 6 which is of metal of high heat conductivity and is adapted to be supported at its forward end within the outer container by means of the links 7 and 7a and normally supported within the outer container in a position so as to engage the front wall 3 of the outer container 1. The rear wall 8 of the carbon dioxide container is provided with outwardly extending ears 9 preferably made of hard rubber or other heat insulating material and pivoted at 10 between said ears in an arm 11 having its upper end rigidly carried by the shaft 12 which extends across the outer container 1 and is mounted in the bearings 13 and 14 carried by the inner wall 15 of the container 1 and adapted to oscillate therein. One end of the shaft 12 extends through the side wall 16 of the outer container 1 and has rigidly attached thereto a curved lever 17, to the outer end of which is connected at 18 the thermostat 19, which is rigidly carried by a bracket 20 carried by the side 16 of the outer container 1. Secured to the bracket 20 are two spaced coil springs 21 which have their free upper ends connected to the bar 22 arranged above the lever 17 and the springs 21 causing a tension of the bar 22 on the notched upper face 23 of the lever. By this arrangement it will be seen that the bar 22 can be moved to or from the pivot 12 for varying the tension of the springs on the lever 17 whereby the time at which the thermostat will move the lever 17 can be varied for changing the temperature at which the lever will be moved, necessarily controlling the temperature surrounding the unit as will be later more fully described. The inner carbon dioxide container 6 is supported within the outer container by means of the links 7 and 7a and the lever 12 swings it in or out of contact with the wall 3 of the outer container. The normal position of the inner container is such that there is an air space entirely surrounding it between the inner and outer containers during the normal operation of the apparatus.

The lower end of the inner carbon dioxide container 6 is provided with a rectangular space 24 which communicates with the opening 5 in the front wall 3 of the outer container. Pivotally mounted to the front wall 3 at 25 is a door 26 which is normally held in its closed position as shown in Figure 2 of the drawings, by means of the spring 27. The space 24 is adapted to receive an ice tray in which the ice cubes are frozen, and from Figure 2 of the drawings, it will be seen that the ice tray would be at all times carried by and in direct contact with the inner carbon dioxide container 6. In order to at all times form a tight joint between the space 24 carrying the ice tray and the outer container, I provide a rubber gasket 28 and as the inner carbon dioxide container swings in and out, a tight joint is formed with the outer container so that air cannot pass into the container when the door 26 of the ice tray space 24 is opened. The door 26 is lined with cork 28a. My improved unit is adapted for household refrigerators and can be placed in the average refrigerator without any change in the structure of the refrigerator and the circulation of air in the refrigerator will be the same as when ice is used, as shown by the arrows in Figure 1 of the drawings, although it could be used for any cooling purposes.

In Figure 1 of the drawings, an ordinary refrigerator 29 is shown in which my improved unit is placed in the ice compartment 29a with the thermostat 19 extending into the food compartment 30. From this structure it will be seen that as the air circulates in the refrigerator, as shown by the arrows, it comes into contact with the thermostat and when the thermostat is effected by a rise in the temperature of the air in the refrigerator, the thermostat moves or expands outwardly moving the lever 17 in the direction of the arrow, Figure 4, working the shaft 13 and the arm 12 moves the inner carbon dioxide container 6 towards the right, towards the front wall 3 of the outer container and whereby heat is transferred from the wall 3 to the inner carbon dioxide container. It has been found that there is certain amount of transfer of heat from the wall 3 and the inner container before there is a positive thermal connection between the same. This contact or near contact is held until the temperature of the refrigerator is cooled to a predetermined degree which causes the thermostat 16 to retract and the inner carbon dioxide container 6 is swung to the left moving it away from the front wall 3 of the outer container. By adjusting the plate 20, carried by the springs 21, to or from the pivot 12 of the lever 17 the temperature at which the thermostat acts can be readily changed. It is understood that by moving the bar 20 towards the free end of the lever 17 it will increase the pressure on the lever due to the movement of the bar from the fulcrum point thereof. This bar 20 will preferably rest in notches in the lever 17 and each notch will indicate a certain degree of temperature thus enabling the thermostat to act at any predetermined degree of temperature.

While I have shown and described my improved unit as applied to a household refrigerator, it will be understood that the same may be used in any container or refrigerating plant or in a cooling system whereby the unit could be surrounded by casing and having an air inlet and discharge for causing the circulation of the air therearound.

In the modification shown in Figures 5 and 6, the outer container 1 has the inner container 31 located therein and spaced therefrom and supported by the insulating blocks 32. The lower end of the inner container is of highly heat absorbing metal and forms the space for the ice trays. The outer container has pivoted in one wall at 34 a heat absorbing member 35 which is provided with veins 36 for readily absorbing the heat from the receptacle in which the unit is placed. Surrounding the heat absorbing member 35 is a rubber gasket 36a to prevent the passage of air into the outer container.

The heat absorbing member 35, when in its innermost position, engages the one wall of the ice tray portion 33 of the inner container and whereby the heat is transferred to the inner container. In order to move the heat absorbing member 35 to and from the inner container, I provide a thermostat 37 which engages an arm 38 carried by the rock shaft 39 mounted in ears 40 and 41 carried by the lower end of the outer container. The rock shaft has an arm 42 rigidly carried thereby which extends on both sides thereof. The end 43 of this arm has a coil spring 44 connected thereto and the opposite end of the arm engages the center of the heat absorbing member 35 adjacent its lower end. The heat absorbing member 35 is provided with the plate 45 under which the arm extends and whereby the member is moved in and out by the rocking of the arm 42. The heat absorbing member is normally held in engagement with the inner container. When in use, however, the solid carbon dioxide cools the container in which the unit is placed. The thermostat rocks the shaft 39 and the arm moves the heat absorbing member away from the inner container all of which will be understood by references to the preferred form.

While I have shown the heat absorbing member engaging the ice tray position of the inner container it will be understood that it could directly engage the inner container as in some instances there would be no ice tray portion in the inner container.

I claim:

1. An apparatus of the character described, comprising an outer container, an inner container adapted to hold solid carbon dioxide and having a space between the containers for receiving the carbon dioxide vapor, means for causing two of the opposed walls of the inner and outer containers to move to or from each other for varying the space between the walls for causing the transfer of heat from the outer to the inner container.

2. An apparatus of the character described, comprising an outer container, an inner container adapted to hold solid carbon dioxide and having a space between the containers, means for conveying the carbon dioxide vapor from the inner container to the space between the inner and outer containers, means for moving two of the opposed walls of the inner and outer containers toward or from each other for varying the space between the walls for causing a transfer of heat from the outer to the inner container.

3. An apparatus of the character described, comprising an outer container, an inner container adapted to hold solid carbon dioxide and having a space between the containers for receiving the carbon dioxide vapor and means for bringing one wall of the inner container in contact with one wall of the outer container for making a thermal connection between the containers for transferring heat from the outer container to the inner container.

4. An apparatus of the character described, comprising an outer container, an inner container adapted to hold solid carbon dioxide and having a space between the containers for receiving the carbon dioxide vapor, means for moving one wall of the inner and outer containers towards or from each other for varying the space between the walls of the containers for causing a transfer of heat from the outer to the inner container and thermostatic means for controlling the means for moving the walls toward and from each other.

5. An apparatus of the character described, comprising an outer container, an inner container adapted to hold solid carbon dioxide and having a space between the containers, means for conveying the vapor from the inner container to the space between the inner and outer containers, means for varying the space between the two opposed walls of the inner and outer containers for varying the transfer of heat from the outer container to the inner container.

6. An apparatus of the character described, comprising an outer container, an inner container within the outer container and spaced from the walls thereof, said space receiving carbon dioxide vapor and means for moving the inner container towards or away from the outer container whereby a variation of heat, transmitted from the outer container to the inner container is obtained.

7. An apparatus of the character described, comprising an outer container, an inner container adapted to hold solid carbon dioxide within the outer container and spaced from the wall thereof, said space receiving carbon dioxide vapor means for moving the inner container towards or away from the outer container and thermostatic means for controlling said means.

8. An apparatus of the character described, comprising an outer container, an inner container within the outer container and spaced from the walls thereof and adapted to hold solid carbon dioxide, means for conveying the carbon dioxide vapor from the inner container to the space between the containers, means for moving the inner container to or from one wall of the outer container and a thermostat controlling said moving means.

9. An apparatus of the character described, comprising an outer container composed of insulating material, a heat absorbing member in one wall of the outer container, a movable inner container within the outer container and spaced from the walls thereof and adapted to hold solid carbon dioxide and automatic means for moving the inner container to or from the heat absorbing member for transmitting heat to the inner container.

10. An apparatus of the character described, comprising an outer container composed of insulating material, a heat absorbing member in one wall of the outer container, a movable inner container within the outer container and spaced from the walls thereof and adapted to hold solid carbon dioxide and thermostatically controlled means for moving the inner container in engagement with the heat absorbing member for transmitting heat to the inner container.

11. An apparatus of the character described, comprising an outer container, an inner container within the outer container and spaced from the walls thereof and receiving and holding solid carbon dioxide, the space between the walls of the inner and outer containers adapted to receive the carbon dioxide vapor and means for moving the inner container towards or away from the outer container for transmitting heat from the outer container to the inner container.

12. An apparatus of the character described, comprising an outer container, an inner container within the outer container and spaced from the walls thereof and adapted to hold solid carbon dioxide, and means for conveying carbon dioxide vapor to the space between the containers and thermostatically controlled means for moving the inner container towards or away from the outer container for transmitting heat from the outer container to the inner container.

13. An apparatus of the character described, comprising an outer container made of insulating material, a heat absorbing member carried by one portion of the outer container, an inner container movably supported within the outer container and insulated therefrom and spaced from the walls thereof and adapted to hold solid carbon dioxide, means controlled from the outside of the outer container for moving the inner container towards or away from the heat absorbing member of the outer container whereby heat is transmitted from the heat absorbing member to the inner container.

14. An apparatus of the character described, comprising an outer container made of insulating material, a heat absorbing member in one wall of the outer container, an inner container movably supported within the outer container and spaced from the walls thereof, thermostatically controlled means on the outside of the outer container for moving the inner container towards or away from the heat transmitting member of the outer container and an ice tray arranged within the heat absorbing member and removable from the outside of the outer container.

15. An apparatus of the character described, comprising an outer container made of insulating material, a heat absorbing member arranged in one wall of the outer container, an inner movable container made of heat transmitting material within the outer container and spaced from the walls of the outer container, means for conveying carbon dioxide vapor from the inner container to the space between the containers and thermostatic means for moving the inner container to or from the heat transmitting member carried by the outer container for transmitting heat to the inner container.

16. An apparatus of the character described, comprising an outer container, an inner container adapted to hold solid carbon dioxide and having a space between the containers, and one wall of the outer container having a portion thereof forming a heat absorbing member adapted to move to or from the inner container to transfer heat from the outer container to the inner container.

17. An apparatus of the character described, comprising an outer container, an inner container adapted to hold solid carbon dioxide and having a space between the containers, one wall of the outer container having a heat absorbing portion adapted to be moved to or from the inner container to transfer heat from the outer container to the inner container, and thermostatic means for moving said heat absorbing portion.

18. A cooling unit comprising an outer container, an inner container normally insulated from the outer container, and adapted to receive solid carbon dioxide, means for moving the inner container into contact with the outer container, and means whereby the contacting faces of the container are subjected to carbon dioxide vapor thrown off by the solid carbon dioxide for preventing frost on the contacting surfaces of the container.

19. A cooling unit comprising an outer container, an inner container normally insulated from the outer container, and adapted to receive solid carbon dioxide, means for moving the inner container to cause one wall thereof to contact with one wall of the outer container, and means whereby the contacting surfaces of the container are subjected to carbon dioxide vapor thrown off by the solid carbon dioxide for preventing frost on the contacting surfaces of the container.

20. An apparatus of the character described, comprising an outer container, an inner container adapted to hold solid carbon dioxide and spaced from the outer container, means for conveying the carbon dioxide vapor from the inner container to the space between the containers, and means for varying the space between the inner and outer container for varying the heat transfer from one container to the other container.

21. An apparatus of the character described, comprising, two containers one within the other and spaced from each other, means for varying the space between the containers for varying the heat transfer from one container to the other and means for conveying the vapor from the solid carbon dioxide in the inner container to the space between the containers.

WALTEN B. ROBE.